Feb. 12, 1929.  J. BOËRY  1,701,604
SEAT PROVIDED WITH A RECLINING BACK
Filed July 2, 1927  2 Sheets-Sheet 1
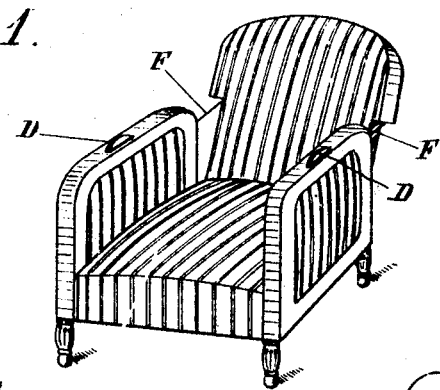
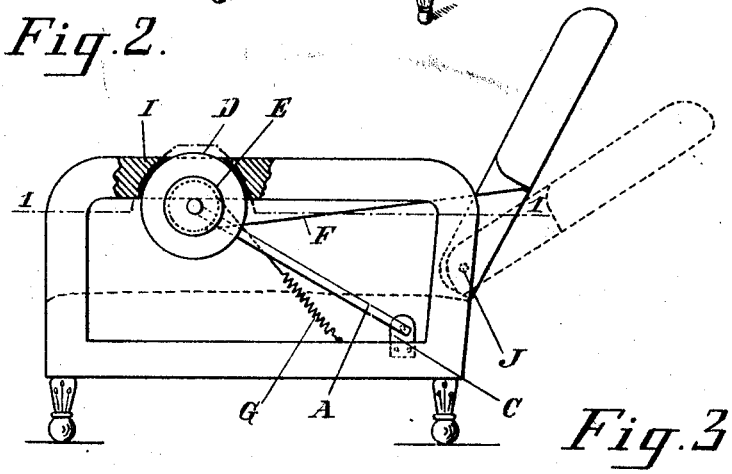
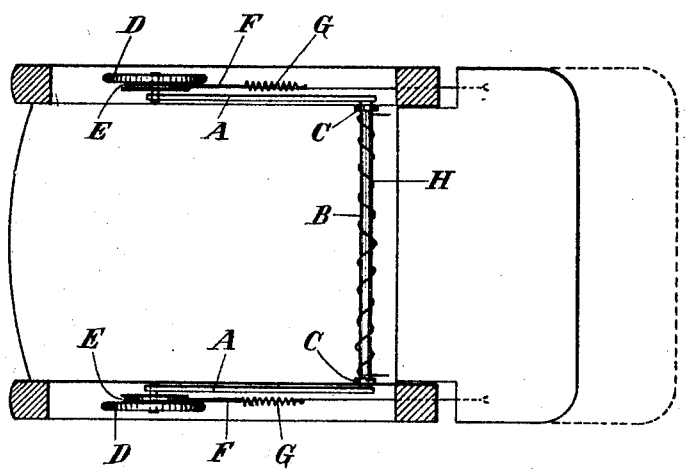
INVENTOR:
Jean Boëry
BY Lung, Boyer & Bakeler
ATTORNEYS

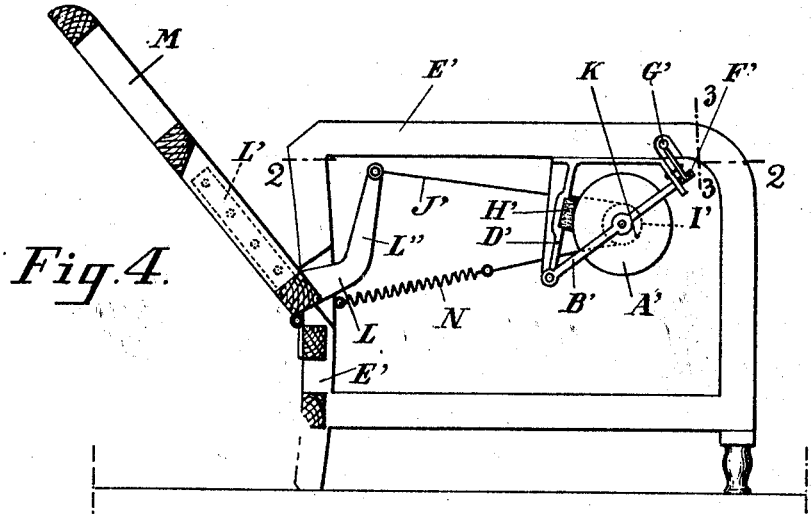
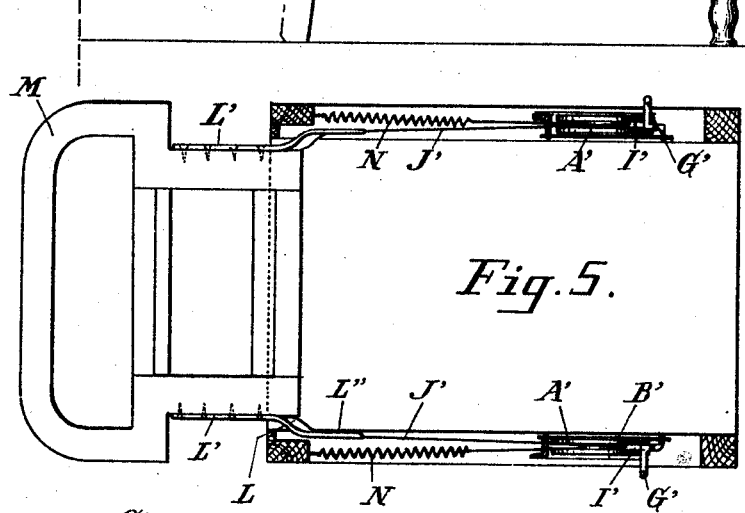
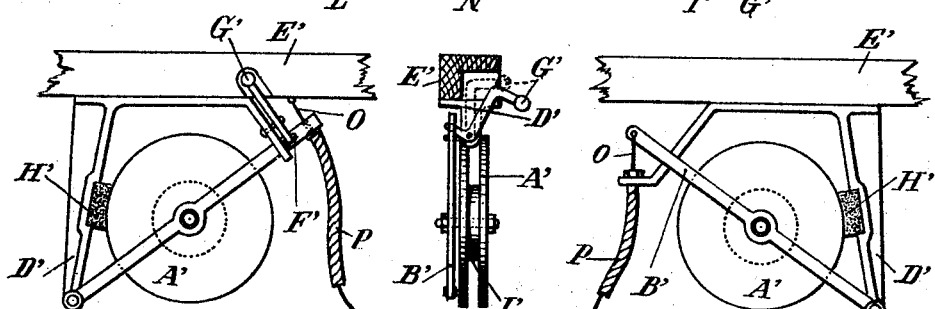

Patented Feb. 12, 1929.

1,701,604

UNITED STATES PATENT OFFICE.

JEAN BOËRY, OF MARSEILLES, FRANCE.

SEAT PROVIDED WITH A RECLINING BACK.

Application filed July 2, 1927, Serial No. 203,136, and in France July 2, 1926.

Seats with a slanting back, the slant of which can be regulated by the person seated therein are already known; the greater number of those, however, use, to fix the back in the desired position, a rack device which is very often jerky and noisy.

The invention concerns a device to regulate the slant, enabling one to place the back of the seat in any intermediate position between the two extremes, which device is gradual and noiseless.

This result is obtained by the use of wheels fitted with grooved pulleys placed in a space provided below the arm-rests of the seat, of cables passing over the grooves of said pulleys and connected, on the one hand, to the back, on the other hand to the frame of the seat, with a spring interposed, and of means to brake said wheels.

The annexed drawings show a preferred embodiment of the invention, in which:

Fig. 1 is a perspective view of a seat showing the upper part of the wheels protruding from the arm-rests, for the operation of the mechanism.

Fig. 2 is a side elevation of the seat having the tapestry taken away in order to show the operating device for the back.

Fig. 3 is a horizontal section of the same seat along the line 1—1 of Fig. 2.

Fig. 4 shows a variation in the embodiment of the same invention.

Fig. 5 is a horizontal section of the seat shown on Fig. 4 along the line 2—2 of said figure.

Fig. 6 is a cross-section in front of the operating device of the back, along the line 3—3 of Fig. 4.

Figs. 7 and 8 show a device to operate the back of the seat by action of one push-button or handle only.

The apparatus shown in Figs. 1 to 3 is made up of a U shaped iron, comprising two arms A—A one on each side of the seat, connected to a tube or rod B, forming the base of said U and swivelling in two brackets C—C acting as bearings.

Each of the two arms A—A carries at its free end a wheel D pivoting freely on a stud integral with the arm A.

Each wheel is provided with a groove E on which is coiled a cable F connected at one end to the back of the seat, and at the other to a spring G or other elastic means, the latter having its after end attached to the frame of the seat. Another spring H is coiled round the tube or rod B, in known manner, so as to force the wheels D—D to remain in their normal position, applied against the walls of the housings I provided for that purpose in the arm-rests of the seat, the upper part of said wheels slightly protruding from the upper side of the arm-rests and the walls of the housing acting on the wheels as brake shoes.

The back of the seat swings on a pivot J.

Being seated, one presses down with the hand on the protruding part of the wheels D—D at the same time imparting to said wheels, forwards or backwards, a rotary motion, according to whether one wishes to increase or decrease the slant of the seat-back.

The object of the downward pressure is to free the wheels D—D by pushing them away from the walls of their housing I—I whereas the rotary motion drives in the desired direction the cable F, housed in the groove E, thus modifying the slope of the seat.

Having obtained the desired slant, one releases the pressure on the wheels D—D which are then forced by the pull of the cable, caused as much by the weight of the body of the person leaning on the back of the seat as by the spring H, to move upwards and press hard against the walls of the housings I—I which prevent a further rotary motion of the wheels.

This braking of the wheels could very well, of course, be obtained through side pressure on the wheels, or by a brake-band, or by any other means.

Should one press down only one of the wheels, both sides of the device should be brought in action all the same, through the action of the rigid U shaped iron, so that the spring G would keep the cable F stretched on the other side as well and, the pressure on the wheel ceasing, both wheels would again be brought to a standstill at points corresponding to an equal stress of the cables F—F.

The U-shaped iron is not really indispensable, though it is useful in avoiding the warping of the back and in allowing of the device being operated with one hand only.

The seat being vacant, in order to restore the back to its position nearest the vertical, one has only got to push said back forwards.

By this motion, the cables F—F are slackened and the wheels are kept against the walls of their housings I only by the action of the spring H; this spring is, however, so made that the pull of the springs G—G is sufficient to free said wheels from their housing, and consequently there is no opposition to the rotation of the wheels, so that the springs G—G will again stretch the cables. The automatic return motion of the wheels D—D into their housings, which act as brakes, retains the back in its vertical position.

The wheels can, of course, as well as their housing, be shaped so as to harmonize with the style and the shape of the seat.

The modification of the invention shown in Figs. 4 to 8 presents on the foregoing the following advantages:

1. It enables the wheels to be fully hidden inside the arm-rests of the seat, the only part remaining more or less exposed to view being the handle or push-button actuating the release of the brake.

2. To operate the back through a lever, as described hereafter, thus hiding from sight the connection between the cable and said back.

3. To substitute for the direct action of the hand upon the wheels that of a handle or push-button acting on the wheel-carrying lever direct, so as to free the wheel by pushing same away from the brake-shoe.

4. To simultaneously operate the devices on both sides of the seat by a single handle or push-button, although the connection between the two by a tube or a rod be eliminated. The modified devices comprises:

A frame D', fixed below the arm-rests, carrying at its lower end a swivelling lever B', which lever carries a transverse stud on which is mounted for rotation a wheel A' which may, in this case be a metal one, or be made of any other suitable material. This lever is perforated at its upper end as at F' so as to provide a housing for the end of the operating handle G', fitted into a recess provided in the arm-rest E' of the seat.

The frame D' carries also, on its depending portion a brake-shoe H' fixed thereon by known means and braking the wheel A' when the latter is pressed against it.

As in the previous instance, the wheel has a groove I' in which a cable J' is laid, fixed at one point K in the groove and connected at one end to a plate L secured to the back and at its other end to the frame of the seat at the proper place.

The plate L comprises two arms L' and L'', integral with each other; the one, L' is fixed by known means to the back M of the seat, the other arm, L'', connected to the cable J' is deviated from the plane of the first, in order to be concealed, and to move freely, between the two sides of the arm.

The back is hingedly connected to the frame of the seat.

For operating both levers by means of a single handle or push-botton, a known device (Bowden or other), of steel cable O enclosed in a flexible sheath P, is used, connected to the two levers B' and taking leverage points on the frame of the seat and on the piece D; by duplicating said device the simultaneous freeing of both wheels will be obtained by means of a single push-button or handle, either the left or the right one. Some saving in the cost would be made by reducing the device to single apparatus. In this case, the back M would be operated by a single iron-fitting L, the part L' being fixed to the middle of the back, to prevent warping.

To straighten the back M of the seat, the only thing required is to cease all pressure upon said back, and to free the wheels A—A the pull of the springs N, transmitted to the piece L by means of the cables J', is sufficient to bring the back to its upright position.

The present invention can indifferently be applied to all reclining-back seats such as arm-chairs, motor-car, ship's and aeroplane seats, etc.

Having now particularly described my invention and ascertained the nature thereof I declare that what I claim is:—

1. A device of the character described, comprising in combination, a seat frame having an arm rest, an adjustable reclining back pivotally secured to the seat frame, a pivoted lever disposed for swinging movement within the space enclosed by said arm rest, a friction wheel mounted for rotation on said lever within said space, a pulley rigidly secured to said friction wheel, a flexible member connected at one end to said adjustable back and having its opposite end coiled on said pulley, a spring connected at one end to the pulley end of said flexible member and at its opposite end to the seat frame, means for normally braking said friction wheel, and means for swinging said lever on its pivot thereby to release the wheel from said braking means.

2. A device of the character described, comprising in combination, a seat frame having an arm rest, a reclining back pivoted to said seat frame, a lever pivoted within the space enclosed by said arm rest, a friction wheel mounted for rotation on said lever, a pulley rigidly connected to said friction wheel, a member rigidly connected to said back and having an arm within the space enclosed by the arm rest, a flexible member connected at one end to said arm and having its opposite end coiled on said pulley, means disposed within the arm rest for normally braking said friction wheels, a spring connected at one end to the seat frame and at its opposite end to the pulley end of said flexible member, and means for releasing the friction wheels from said braking means to permit adjustment of said back.

3. A device of the character described, comprising in combination, a seat frame having an arm rest, a reclining back pivoted to said seat frame, a lever pivoted within the space enclosed by said arm rest, a friction wheel mounted for rotation on said lever, a pulley rigidly connected to said friction wheel, a member rigidly connected to said back and having an arm within the space enclosed by the arm rest, a flexible member connected at one end to said arm and having its opposite end coiled on said pulley, means disposed within the arm rest for normally braking said friction wheel, a spring connected at one end to the seat frame and at its opposite end to the pulley end of said flexible member, an operating handle pivoted in a recess of the arm rest in contact with said lever and adapted to operate the same to release the friction wheel from said braking means to permit adjustment of said back, the strength of the spring being sufficient for normally keeping the friction wheel braked.

4. A device of the character described, comprising in combination, a seat frame having a pair of arm rests, an adjustable back pivotally secured to said frame, a lever pivoted within each of said arm rests, a friction wheel mounted for rotation on each of said levers, a pulley rigidly connected to each of said friction wheels, supporting members secured to said back at opposite sides of the seat frame and each having an arm disposed within one of said arm rests, a flexible member disposed in each of said arm rests and having one end secured to its respective supporting-member arm and its opposite end coiled around its companion pulley, a brake for each friction wheel disposed within the arm rest, a spring for each flexible member connected at one end to the seat frame and at its opposite end to said flexible member thereby to maintain the latter in taut condition and the friction wheel braked, and means for simultaneously freeing both friction wheels.

In testimony whereof I have signed my name to this specification.

JEAN BOËRY.